US012204353B2

(12) United States Patent
Hsieh

(10) Patent No.: US 12,204,353 B2
(45) Date of Patent: Jan. 21, 2025

(54) SOFT START MODULE

(71) Applicant: Dartpoint Tech. Co., Ltd., Taipei (TW)

(72) Inventor: Chung-Hsin Hsieh, Taipei (TW)

(73) Assignee: Dartpoint Tech. Co., Ltd., Taipei (TW)

( * ) Notice: Subject to any disclaimer, the term of this patent is extended or adjusted under 35 U.S.C. 154(b) by 328 days.

(21) Appl. No.: 17/960,176

(22) Filed: Oct. 5, 2022

(65) Prior Publication Data

US 2023/0112679 A1 Apr. 13, 2023

Related U.S. Application Data

(60) Provisional application No. 63/253,603, filed on Oct. 8, 2021.

(51) Int. Cl.
*G05F 1/46* (2006.01)
*G05F 3/20* (2006.01)
*G05F 5/00* (2006.01)

(52) U.S. Cl.
CPC .............. *G05F 1/468* (2013.01); *G05F 1/465* (2013.01); *G05F 3/20* (2013.01); *G05F 5/00* (2013.01)

(58) Field of Classification Search
CPC ............. G05F 1/465; G05F 1/468; G05F 3/20
See application file for complete search history.

(56) References Cited

U.S. PATENT DOCUMENTS 5,861,771 A * 1/1999 Matsuda ................. G05F 1/465 327/543
2013/0271104 A1* 10/2013 Fu ............................ G05F 3/08 323/299
2018/0069407 A1* 3/2018 Herrera ............ H02J 7/007182
2021/0296987 A1* 9/2021 Wu ........................ H02M 1/36

* cited by examiner

*Primary Examiner* — Jue Zhang
*Assistant Examiner* — Lakaisha Jackson
(74) *Attorney, Agent, or Firm* — BACON & THOMAS, PLLC

(57) ABSTRACT

A soft start module includes a power component, a current sensing component, a reference voltage generating circuit, and a constant current control circuit. The power component has a first terminal connected to a first node, a second terminal connected to an Output node, and a third terminal connected to a third node. The current sensing component has a fourth terminal connected to an input node and a fifth terminal connected to the first node. The reference voltage generating circuit has a seventh terminal connected to a fourth node and an eighth terminal connected to a ground node. The constant current control circuit has a ninth terminal connected directly or indirectly to the fifth terminal of the current sensing component, a tenth terminal connected the fourth node, and an eleventh terminal connected to the third node.

22 Claims, 6 Drawing Sheets

SOFT START MODULE

CROSS REFERENCE TO RELATED APPLICATION

This application claims the benefit of filing date of U.S. Provisional Application Ser. No. 63/253,603, entitled "Soft Start Module" filed Oct. 8, 2021 under 35 USC § 119(e)(1).

BACKGROUND OF THE INVENTION

1. Field of the Invention

The present invention relates to a soft start module and, more particularly, to a soft start module implemented by a constant current control circuit.

2. Description of Related Art

The development of contemporary automobile industry is owed to a great number of electronic components introduced in automobiles, but they also bring about some electrical problems when they are using batteries in the automobiles. An electronic component shall be designed to have a characteristic of power consumption as low as possible, and it shall also be designed to decrease the inrush current at the starting moment of an automobile. An electronic component having a greater load and consuming a greater current at the starting moment, such as a light bulb, is typically installed with a certain current limiting module, so as to avoid the automobile failure to start at the starting moment caused by excessive current consumption by the electronic component. In other words, a soil start function is required to avoid damage or malfunction caused by the excessive inrush current.

In a traditional approach, a constant current controller is introduced to a load, such as a light bulb, and the constant current controller is designed to have a constant current mode, in which the inrush current at the starting moment is only ⅕ to 1⁄10 of the current at cold start (or cold boot) of the light bulb, so that an automobile can start normally. However, the traditional approach has a disadvantage wherein after the automobile starts, the increase of the temperature inside the automobile will cause the decrease of the constant current due to the variation of the temperature coefficient, and the decrease of the constant current will cause not only the dimming of the light bulb, but also the divided voltage increase of the internal power component of the constant current controller, and the increase of the voltage will cause the temperature increase of the constant current controller and the decrease of its service life.

Therefore, it is desirable to provide an improved soft start module to mitigate and/or obviate the aforementioned problems.

SUMMARY OF THE INVENTION

The present invention is provided to avoid the occurrence of large current when the power source varies at the input node, for example, a pulsed power is inputted, or an input power source is turned on or oil, or at the moment of two or more loads switch at the output node.

In one aspect of the present invention provided a soft start module including a power component, a current sensing component, a reference voltage generating circuit, and a constant current control circuit. The power component has a first terminal connected to a first node, a second terminal connected to an output node, and a third terminal connected to a third node. The current sensing component has a fourth terminal connected to an input node and a fifth terminal connected to the first node. The reference voltage generating circuit has a seventh terminal connected to a fourth node and an eighth terminal connected to a ground node. The constant current control circuit has a ninth terminal connected directly or indirectly to the fifth terminal of the current sensing component, a tenth terminal connected the fourth node, and an eleventh terminal connected to the third node.

(It should be noted that the aforementioned ordinal numbers are only used to distinguish the respective terminals, and they are not necessary to be listed as successive numbers.)

Optionally or preferably, the output node is connected to a first load and a second load via a switch.

Optionally or preferably, the power component is a first transistor, the first transistor is a power transistor, and the power transistor is a power MOSFET, an IGBT, or a SitC MOSFET.

Optionally or preferably, the current sensing component inch des a fourth resistor connected between the input node and the first node.

Optionally or preferably, the reference voltage generating circuit includes a first Zener diode or a first voltage stabilizer IC connected between the input node and a first resistor, and a voltage divider formed of a second resistor and a third resistor is connected in parallel to the first Zener diode or a first voltage stabilizer IC, wherein the second resistor and the third resistor are connected at the fourth node.

Optionally or preferably, the constant current control circuit includes a first amplifier having a non-inverting input end connected to the fourth node, an inverting input end connected directly or indirectly to the first node, and an output end connected directly or indirectly to the third node.

Optionally or preferably, the current sensing component further includes a sixth terminal connected to a second node, and the ninth terminal of the constant current control circuit is connected to the second node.

Optionally or preferably, the inverting input end of the first amplifier is connected to the second node.

Optionally or preferably, the soft start module further includes a fifth resistor connected between the first node and the second node.

Optionally or preferably, the soft start module further includes a sixth resistor connected between the output end of the first amplifier and the third node.

Optionally or preferably, the soft start module further includes a second. Zener diode or a second voltage stabilizer IC connected between the first node and the third node.

Optionally or preferably, the soft start module further includes a second capacitor connected between the second node and the output end of the first amplifier.

Optionally or preferably, the soft start module further includes a second Zener diode or a second voltage stabilizer IC connected between the output end of the first amplifier and the third node.

Optionally or preferably, the soft start module further includes a sixth resistor connected between the input node and the third node.

Optionally or preferably, the soft start module further includes an activating circuit connected among the input node, the output node, and the constant current control circuit, wherein the activating circuit is configured to detect a load at the output node, and activate the constant current control circuit if a load exists at the output node, but deactivate the constant current control circuit if no load exists at the output node.

Optionally or preferably, the activating circuit includes a second transistor used to activate or deactivate the constant current control circuit.

Optionally or preferably, the activating circuit includes a second amplifier used to control the second transistor by comparing the output node's voltage and the input node's voltage.

Optionally or preferably, the current sensing component includes a first parallel circuit formed of a first inductor and a first diode connected between the input node and the first node.

Optionally or preferably, the current sensing component includes a fourth resistor connected between the input node and the first parallel circuit.

Optionally or preferably, the second terminal of the first transistor is indirectly connected to the output node, and the soft start module further includes a second parallel circuit formed of a second inductor and a second diode connected between the second terminal of the first transistor and the output node.

Optionally or preferably, the soft start module further includes an amplifier to amplify a signal from the current sensing component.

Optionally or preferably the first amplifier of the constant current control circuit serves as a first comparator and the constant current control circuit includes a driver connected between the first comparator and the power component.

In another aspect of the present invention, before performing the comparison with respect to a sensed signal, an amplifying circuit may be added to amplify the sensed signal, so as to significantly lower the temperature rise of a current sensing component and, at the same time, to increase the response speed against the current variation.

Other objects, advantages, and novel features of the invention will become more apparent from the following detailed description when taken in conjunction with the accompanying drawings.

DETAILED DESCRIPTION OF THE EMBODIMENT

Figure 1:
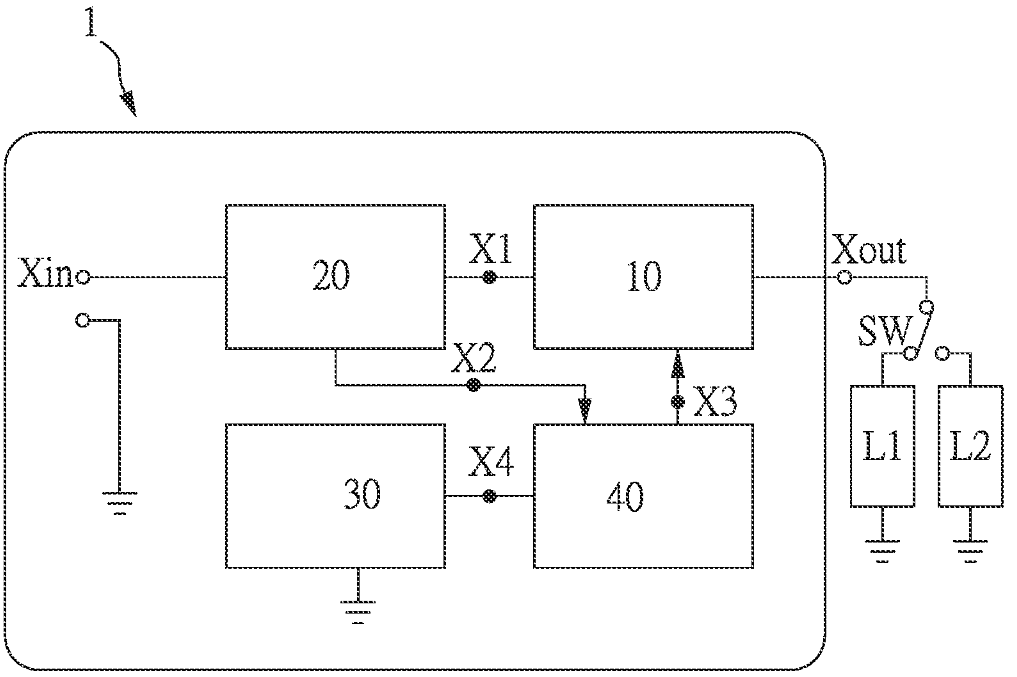
FIG. 1 is a block diagram of the soft start module according one embodiment of the present invention.

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not mean that there is essentially a level, a rank, an executing order, or a manufacturing order among the elements, except otherwise specified. A "first" element and a "second" element may exist together in the same component, or alternatively, they may exist in different components, respectively. The existence of an element described by a greater ordinal number does not essentially mean the existent of another element described by a smaller ordinal number.

Moreover, in the present specification, the terms, such as "top", "bottom", "left", "right", "front", "back", or "middle", as well as the terms, such as "on", "above", "under", "below", or "between", are used to describe the relative positions among a plurality of elements, and the described relative positions may be interpreted to include their translation, rotation, or reflection.

Moreover, in the present specification, when an element is described to be arranged "on" another element, it does not essentially mean that the elements contact the other element, except otherwise specified. Such interpretation is applied to other cases similar to the case of "on".

Moreover, in the present specification, the terms, such as "preferably" or "advantageously", are used to describe an optional or additional element or feature, and in other words, the element or the feature is not an essential element, and may be ignored in some embodiments.

Moreover, in the present specification, when an element is described to be "suitable for" or "adapted to" another element, the other element is an example or a reference helpful in imagination of properties or applications of the element, and the other element is not to be considered to form a part of a claimed subject matter; similarly, except otherwise specified; similarly, in the present specification, when an element is described to be "suitable for" or "adapted to" a configuration or an action, the description is made to focus on properties or applications of the element, and it does not essentially mean that the configuration has been set or the action has been performed, except otherwise specified.

Moreover, each component may be realized as a single circuit or an integrated circuit in suitable ways, and may include one or more active elements, such as transistors or logic gates, or one or more passive elements, such as resistors, capacitors, or inductors, but not limited thereto. Each component may be connected to each other in suitable ways, for example, by using one or more traces to form series connection or parallel connection, especially to satisfy the requirements of input terminal and output terminal. Furthermore, each component may allow transmitting or receiving input signals or output signals in sequence or in parallel. The aforementioned configurations may be realized depending on practical applications.

Moreover, a comparator may be implemented by an amplifier.

Moreover, in the present specification, the terms, such as "system", "apparatus", "device", "module", or "unit", refer to an electronic element, or a digital circuit, an analogous circuit, or other general circuit, composed of a plurality of electronic elements, and there is not essentially a level or a rank among the aforementioned terms, except otherwise specified.

Moreover, in the present specification, two elements may be electrically connected to each other directly or indirectly, except otherwise specified. In an indirect connection, one or more elements, such as resistors, capacitors, or inductors may exist between the two elements. The electrical connection is used to send one or more signals, such as DC or AC currents or voltages, depending on practical applications.

Moreover, in the present specification, a value may be interpreted to cover a range within ±10% of the value, and in particular, a range within ±5% of the value, except otherwise specified; a range may be interpreted to be composed of a plurality of subranges defined by a smaller endpoint, a smaller quartile, a median, a greater quartile, and a greater endpoint, except otherwise specified.

(Block Diagram)

With reference to FIG. 1, there is shown a block diagram of the soft start module 1 according one embodiment of the present invention. The soft start module 1 is connected between an input node Xin and an output node Xout. The input node Xin may be connected to a power source which can provide a voltage of 11.0V to 14.7V, but not limited thereto. The output node Xout may be connected to one or more loads, for example, a first load L1 and a second load L2 via a switch SW, but not limited thereto.

The soft start module 1 includes a power component 10, a current sensing component 20, a reference voltage generating circuit 30, and a constant current control circuit 40.

The power component 10 has a first terminal connected to a first node X1, a second terminal connected to the output node Xout, and a third terminal connected to a third node X3.

The current sensing component 20 has a fourth terminal connected to the input node Xiii and a fifth terminal connected to the first node X1. In some embodiments, the current sensing component 20 may further include a sixth terminal connected to a second node X2.

The reference voltage generating circuit 30 has a seventh terminal connected to a fourth node X4 and an eighth terminal connected to a ground node.

The constant current control circuit 40 has a ninth terminal connected directly or indirectly to the fifth terminal of the current sensing component 20, a tenth terminal connected the fourth node X4, and an eleventh terminal connected to the third node X3. In some embodiments, in case where the current sensing component 20 further includes a sixth terminal connected to a second node X2, the constant current control circuit 40 may be connected to the second node X2 via the ninth terminal.

Hereby, the overall architecture of the soft start module 1 of the present invention is introduced.

(Detailed Circuit of First Embodiment)

Figure 2:
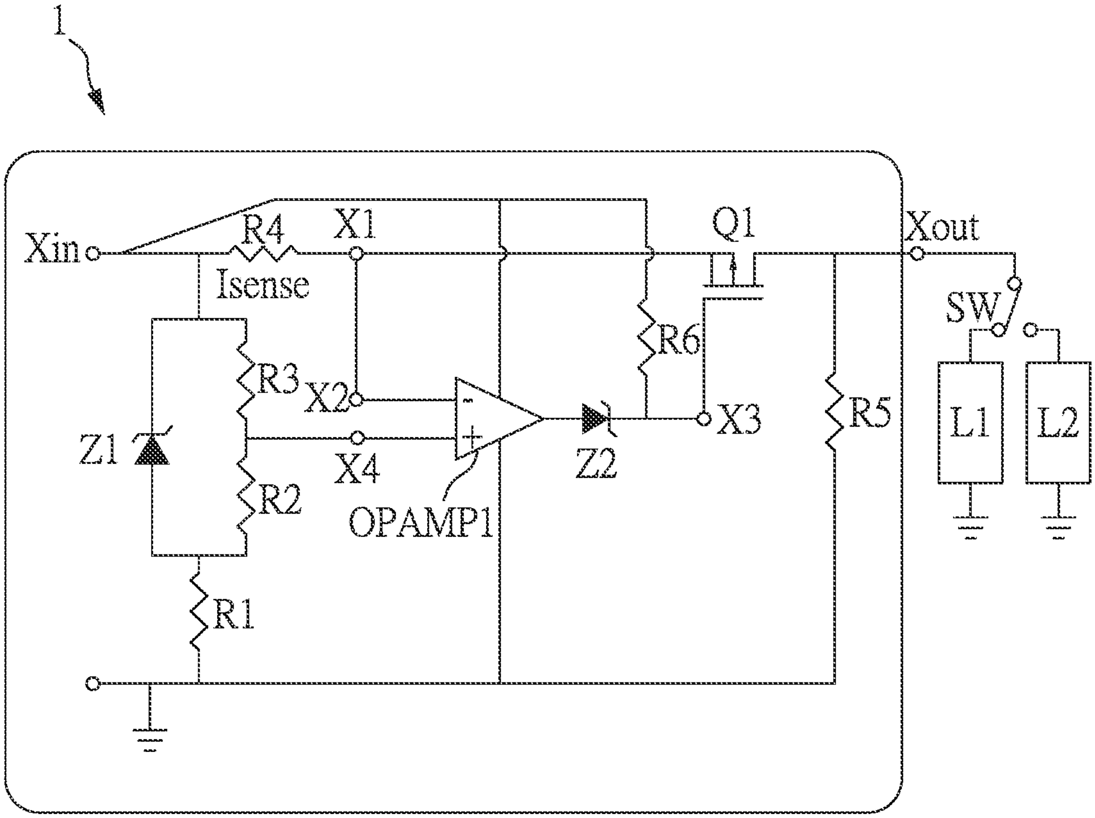
FIG. 2 is a detailed circuit diagram of the soft start module according to the first embodiment of the present invention.

FIG. 2 is a detailed circuit diagram of the soft start module 1 according to the first embodiment of the present invention. The first embodiment is described with reference to FIG. 2 along with FIG. 0.1.

[Current Sensing Component]

The current sensing component 20 in FIG. 1 may include a fourth resistor R4 connected between the input node Xin and the first node X1, as shown in FIG. 2.

Generally, the current sensing component 20 preferably has a small resistance value, and is connected in series with the power component 10, so as to sense the current flowing through the power component 10, converting the sensed current Isense into a suitable voltage value, sending the voltage value to the constant current control circuit 40.

[Power Component]

The power component 10 in FIG. 1 may correspond to a first transistor Q1 in FIG. 2, wherein the first transistor Q1 is a power transistor. The power transistor may be a power metal-oxide-semiconductor field-effect transistor (MOSFET), an insulated gate bipolar transistor (IGBT), or a silicon carbide (Sin MOSFET. There is a fifth resistor R5 connected between the output node Xout and the ground node.

Taking the first transistor Q1 as an example, the first transistor Q1 has a gate connected directly or indirectly to the output end of a first amplifier OPAMP1 in the constant current control circuit 40. It can be understood that a suitable voltage difference (figs) between the gate and the source of the first transistor Q1 can derive a suitable amount of current that flows through the first transistor Q1. The current flows through the current sensing component 20, the source of the first transistor Q1, and the drain of the first transistor Q1, to the output node Xout. The resistor R5 preferably has a middle resistance value for a small current, and serves as a preload at the drain of the first transistor Q1. Such small current provided by the resistor R5 can keep the first transistor Q1 working in the active region and not entering the cutoff region, and therefore the fifth resistor R5 can shorten the switching time of the power transistor Q1, the switching action of the external load can be accelerated, and too much current pulsation can also be avoided.

[Reference Voltage Generating Circuit]

The reference voltage generating circuit 30 in FIG. 1 may include a first resistor R1, a first Zener diode Z1, and a voltage divider, as shown in FIG. 2. The first Zener diode Z1 is connected between the input node Xin and the first resistor R1. As another option, in other embodiments, the first Zener diode may be replaced by a first voltage stabilizer IC. The voltage divider is connected in parallel to the first Zener diode Z1, and the voltage divider is firmed of a second resistor R2 and a third resistor R3, wherein the second resistor R2 and the third resistor R3 are connected to each other at the fourth node X4.

Regarding the operation thereof; the combination of the first resistor R1 and the first Zener diode Z1 can provide a basic voltage level with respect to a positive voltage (the positive voltage may be 11.0V to 14.7V) from the input node Xin. Then, the voltage divider can obtain a reference voltage (the reference voltage may be about hundreds mV) by dividing the basic voltage level. The reference voltage will then be provided to a non-inverting input end (+) of the first amplifier OPAMP1 in the constant current control circuit 40, as will be described later, so as to further control a constant current control voltage required by the first transistor Q1 (for example, the power MOSFET).

For convenience of explaining the embodiments of the present invention, the ground may be regarded as a relatively positive voltage level, and the other voltage levels may be defined with respect to the ground.

[Constant Current Control Circuit]

The constant current control circuit 40 in FIG. 1 may include a first amplifier OPAMP1 as shown in FIG. 2. In particular, the first amplifier OPAMP1 has a non-inverting input end (+) connected to the fourth node X4, an inverting input end (−) connected directly or indirectly to the first node X1 and an output end connected directly or indirectly to the third node X3. It is to be understood that an indirect connection between two elements means that one or more intermediary elements are arranged in the connection path between the two elements. There is a sixth resistor R6 connected between the input node Xin and the third node X3.

Generally, the constant current control circuit 40 is formed by the first amplifier OPAMP L with its non-inverting input end (+) connected to the voltage divider thrilled of the second resistor R2 and the third resistor R3, its inverting input end (−) connected to the downstream end of the current sensing component 20 (that is, the fourth resistor R4). The inverting input end (−) of the first amplifier OPAMP1 is regarded to be relatively negative with respect to the voltage of 11.0 to 14.7 V at the input node Xin. The output end of the first amplifier OPAMP1 may be connected to a second Zener diode Z2 having a small voltage value, and when the first amplifier OPAMP1 cannot output a sufficient output voltage level, the second Zener diode Z2 can help to reach it. The second Zener diode Z2 may be omitted when a rail-to-rail OPAMP is used. The sixth resistor R6 serves as a pull-up resistor to provide a precise voltage level in case the power transistor Q1 has to be completely turned off (The first transistor Q1 may be a PMOS transistor.) The output end of the first amplifier OPAMP1 is connected through the second Zener diode Z2 to the gate of the first transistor Q1, so as to control the voltage difference (Vgs) between the gate and the source of the first transistor Q1, and therefore control a suitable amount the current flowing through the first transistor Q1.

(Detailed Circuit of Second Embodiment)

Figure 3:
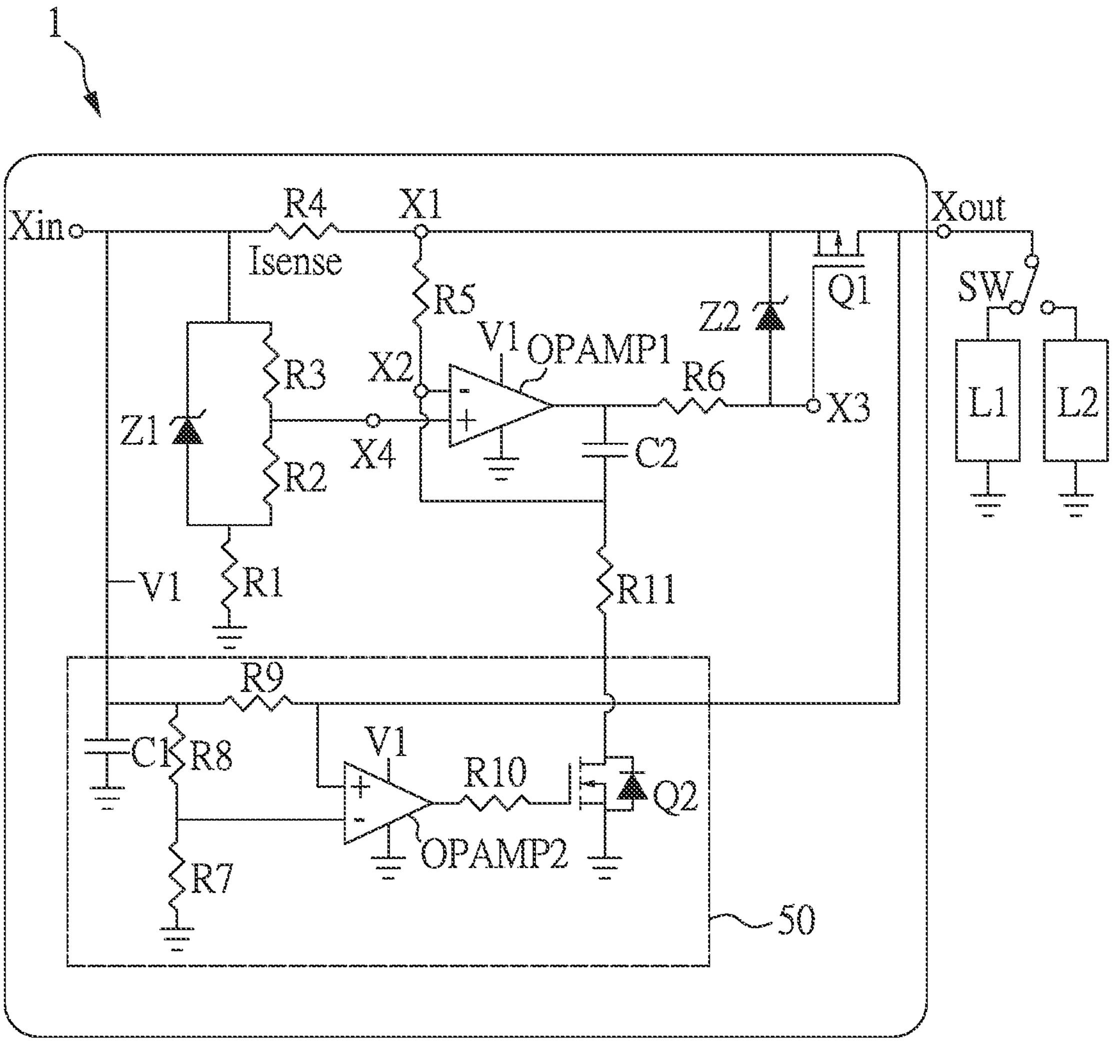
FIG. 3 is a detailed circuit diagram of the soft start module according to the second embodiment of the present invention.

FIG. 3 is a detailed circuit diagram of the soft start module 1 according to the second embodiment of the present invention. The second embodiment is described with reference to FIG. 3 along with FIG. 0.1.

[Current Sensing Component]

The current sensing component 20 in FIG. 1 may include a fourth resistor R4 connected between the input node Xin and the first node X1, as shown in FIG. 3. A sensed current Isense can flow through the fourth resistor Rt.

[Power Component]

The power component 10 in FIG. 1 may correspond to a first transistor Q1 in FIG. 3, wherein the first transistor Q1 is a power transistor. The type of the power transistor may be referred to those in the first embodiment. In this embodiment, there is further a second Zener diode Z2 connected between the first node X1 and the third node X3. As another option, in other embodiments, the second Zeller diode Z2 may be replaced by a second voltage stabilizer IC.

[Reference Voltage Generating Circuit]

The reference voltage generating circuit 30 in FIG. 1 may include a first resistor R1, a first Zener diode Z1, and a voltage divider, as shown in FIG. 3. The first Zener diode Z1 is connected between the input node Xin and the first resistor R1. As another option, in other embodiments, the first Zener diode may be replaced by a first voltage stabilizer IC. The voltage divider is connected in parallel to the first Zener diode Z1, and the voltage divider is firmed of a second resistor R2 and a third resistor R3, wherein the second resistor R2 and the third resistor R3 are connected to each other at the fourth node X4.

Regarding the operation thereof, the combination of the first resistor R1 and the first Zener diode Z1 can provide a basic voltage level with respect to a positive voltage (the positive voltage may be 11.0V to 14.7V) from the input node Xin. Then, the voltage divider can obtain a reference voltage (the reference voltage may be about hundreds mV) by dividing the basic voltage level. The reference voltage will then be provided to a non-inverting input end (+) of a first amplifier OPAMP1 in the constant current control circuit 40, so as to further control a constant current control voltage required by the first transistor Q1 (for example, the power MOSFET).

[Constant Current Control Circuit]

The constant current control circuit 40 in FIG. 1 may include the first amplifier OPAMP1 as shown in FIG. 3, In particular, the first amplifier OPAMP1 has a non-inverting input end (+) connected to the fourth node X4, an inverting input end (−) connected directly to the second node X2 and indirectly to the first node X1 through a fifth resistor R5, and an output end connected indirectly to the third node X3 through a sixth resistor R6. In this embodiment, there is thither a second capacitor C2 connected between the second node X2 and the output end of the first amplifier OPAMP1. The second capacitor C2 can be used to accelerate the response speed of the first amplifier OPAMP1.

[Activating Circuit]

in this embodiment, there is further an activating circuit 50 connected among the input node Xin, the output node Xout, and the constant current control circuit 40. This is an additional unit of the second embodiment in comparison with the first embodiment. The activating circuit 50 is configured to detect a load at the output node Xout, and activate the constant current control circuit 40 if a load exists at the output node Xout, but deactivate the constant current control circuit 40 if no load exists at the output node Xout. In other words, if neither the first load L1 nor the second load L2 exists, the activating circuit 50 will deactivate the constant current control circuit 40.

In particular, the activating circuit 50 mainly includes a second transistor Q2 used to activate or deactivate the constant current control circuit 40, a second amplifier OPAMP2 used to control the second transistor Q2 by comparing the output node Xout's voltage and the input node Xin's voltage. With reference to FIG. 3, the activating circuit 50 further includes a resistor R10 to facilitate the aforementioned control, and a first capacitor C1, and a plurality of resistors R7, R8, and R9, to facilitate the aforementioned voltage comparison. The second amplifier OPAMP2 of the activating circuit 50 is configured to detect a load at the output node Xout, and activate the first amplifier OPAMP1 of the constant current control circuit 40 if a load exists at the output node Xout, but deactivate the first amplifier OPAMP1 of the constant current control circuit 40 if no load exists at the output node Xout.

(Detailed Circuit of Third Embodiment)

Figure 4:
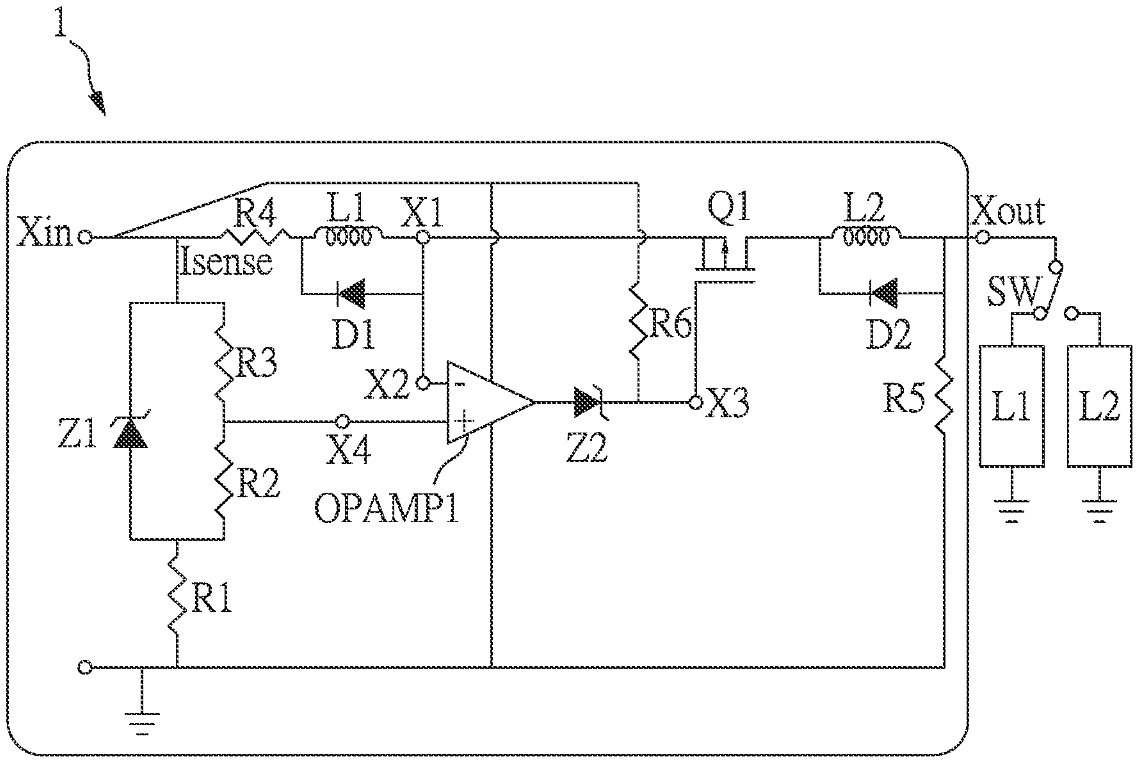
FIG. 4 is a detailed circuit diagram of the soft start module according to the third embodiment of the present invention.

FIG. 4 is a detailed circuit diagram of the soft start module 1 according to the third embodiment of the present invention. The third embodiment is described with reference to FIG. 4 in comparison with the first embodiment as shown in FIG. 2. The third embodiment is almost the same as the first embodiment, except that the current sensing component 20 further includes a first parallel circuit, and that the power component 10 further includes a second parallel circuit.

The first parallel circuit is formed of a first inductor L1 and a first diode D1 connected between the input node Xin and the first node X1. Herein, the first inductor L1 can be used to suppress an external current pulse.

Figure 5A:
FIGS. 5A, 5B, and 5C show a plurality of options for implementing the current sensing component.
Figure 5B:
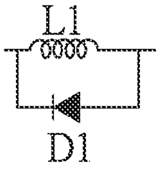
Figure 5C:
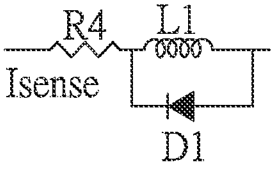

FIGS. 5A, 5B, and 5C, show a plurality of options for implementing the current sensing component 20. In FIG. 5A, the current sensing component 20 includes only a fourth resistor R4. In FIG. 5B, the current sensing component 20 includes only a first parallel circuit formed of a first inductor L1 and a first diode D1. In FIG. 5C, the current sensing component 20 includes a fourth resistor R4 in connection with a first parallel circuit formed of a first inductor L1 and a first diode D1 The circuit designer may choose a preferably option from above to optimize the current sensing component 20. It can be understood that, the first inductor L1 has an internal resistance that can be used to replace the fourth resistor R4.

Referring back to FIG. 4, in this embodiment, the second terminal of the first transistor Q1 is indirectly connected to the output node Xout, because the second parallel circuit is between them. In particular, the second parallel circuit is formed of a second inductor L2 and a second diode D2 connected between the second terminal of the first transistor Q1 and the output node Xout. Herein, the second inductor L2 can be used to suppress an impulse generated by the soft start module itself.

(Block Diagram of Another Embodiment)

Figure 6:
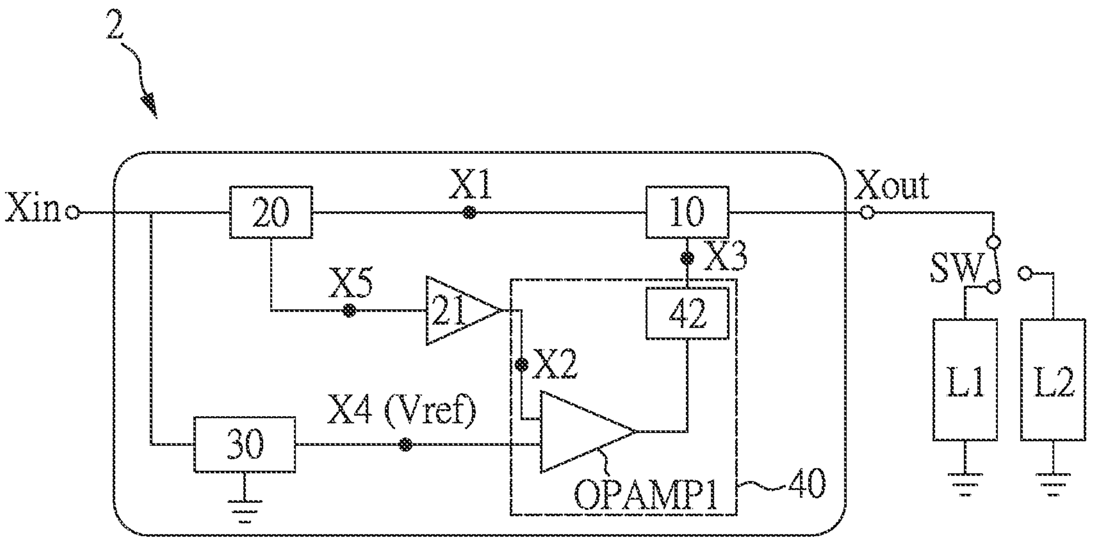
FIG. 6 is a block diagram of the soft start module according to another embodiment of the present invention.

With reference to FIG. 6, there is shown a block diagram of the soft start module 2 according to another embodiment of the present invention. The soft start module 2 is connected between an put node Xin and an output node Xout. The input node Xin may be connected to a power source. The output node Xout may be connected to one or more loads, for example, a first load L1 and a second load L2 via a switch SW, but not limited thereto.

The soft start module 2 includes a power component 10, a current sensing component 20, an amplifier 21, a reference voltage generating circuit 30, and a constant current control circuit 40.

The power component 10 has a first terminal connected to a first node X1, a second terminal connected to the output node Xout, and a third terminal connected to a third node X3.

The current sensing component 20 has a fourth terminal connected to the input node Xin, a fifth terminal connected to the first node X1, and a sixth terminal connected to a fifth node X5.

The amplifier 21 is connected between the fifth node X5 and a second node X2, and is configured to amplify a sensed signal from the current sensing component 20.

The reference voltage generating circuit 30 has a seventh terminal connected to the input node Xin and an eighth terminal connected to a fourth node X4 to output a reference voltage Vref. Typically, the reference voltage generating circuit 30 may have an additional node connected to a ground node.

The constant current control circuit 40 includes a first comparator OPAMP1 and a driver 42. The first comparator OPAMP1 may correspond to the first amplifier OPAMP1 in the aforementioned embodiments. The comparator OPAMP1 has a ninth terminal connected to the second node X2, a tenth terminal connected the fourth node X4 to receive the reference voltage Vref, and an output end connected to the driver 42. The driver 42 is connected between the comparator OPAMP1 and the third node X3. The comparator OPAMP1 is configured to perform a comparison between the amplified sensed voltage which is converted from the sensed current Isense and the reference voltage Vref. If the amplified sensed voltage is higher than the reference voltage Vref, it will turn off the power component 10; if the amplified sensed voltage is lower than the reference voltage Vref, it will turn on the power component 10. The driver 42 includes a delay circuit, formed by a capacitor, for example, that can delay its control action to the power component 10.

(Block Diagram of Still Another Embodiment)

Figure 7:
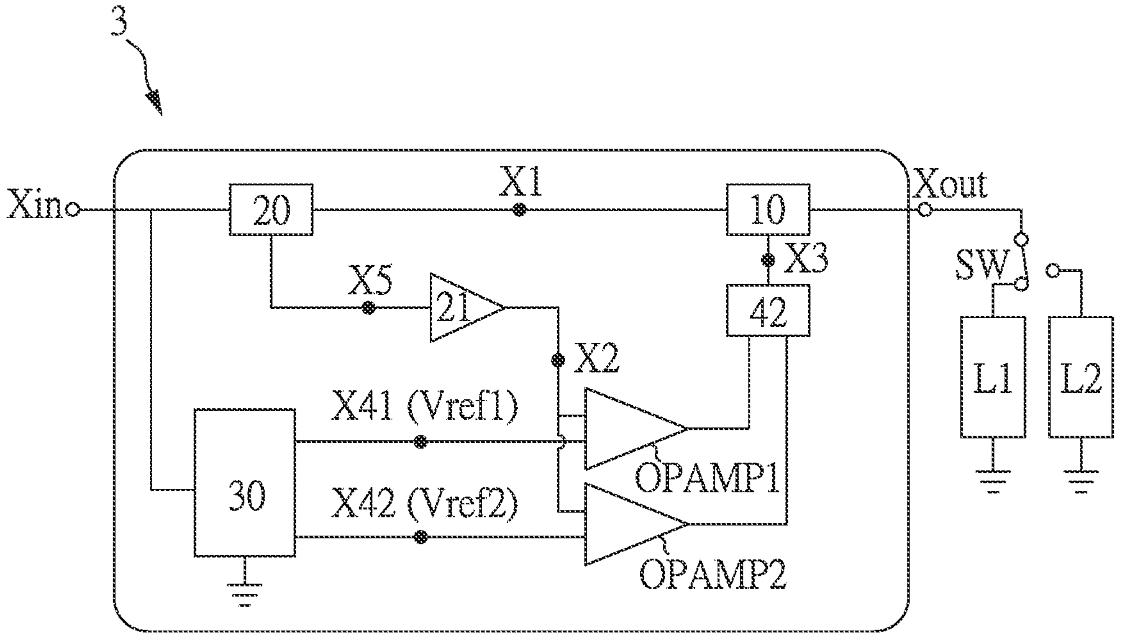
FIG. 7 is a block diagram of the soft start module according to still another embodiment of the present invention.

With reference to FIG. 7, there is shown a block diagram of the soft start module 3 according to still another embodiment of the present invention. This embodiment is described with reference to FIG. 7 in comparison with the embodiment as shown in FIG. 6. This embodiment of FIG. 7 is almost the same as the embodiment of FIG. 6, except that the reference voltage generating circuit 30 is configured to generate a first reference voltage Well and a second reference voltage Vref2, and that there are therefore a first comparator OPAMP1 and a second comparator OPAMP2 introduced to receive the first reference voltage Vref1 and the second reference voltage Vref2, respectively.

The first comparator OPAMP1 is configured to perform a comparison between the amplified sensed voltage and the reference voltage Vref1. If the amplified sensed voltage is higher than the reference voltage Weft, it will turn off the power component 10; if the amplified sensed voltage is lower than the reference voltage Vref1, it will turn on the power component 10. The driver 42 includes a delay circuit, formed by a capacitor, for example, for the first comparator OPAMP1 that can delay its control action to the power component 10.

The second comparator OPAMP2 is configured to perform a comparison between the amplified sensed voltage and the reference voltage Vref2. If the amplified sensed voltage is higher than the reference voltage Vref2, it will rapidly turn off the power component 10; if the amplified sensed voltage is lower than the reference voltage Vref1, it will rapidly turn on the power component 10. The driver 42 includes an undelayed circuit, formed by a discharge circuit, for example, for the second comparator OPAMP2, that can avoid delaying its control action to the power component 10.

(Detailed Circuit of Fourth Embodiment)

Figure 8:
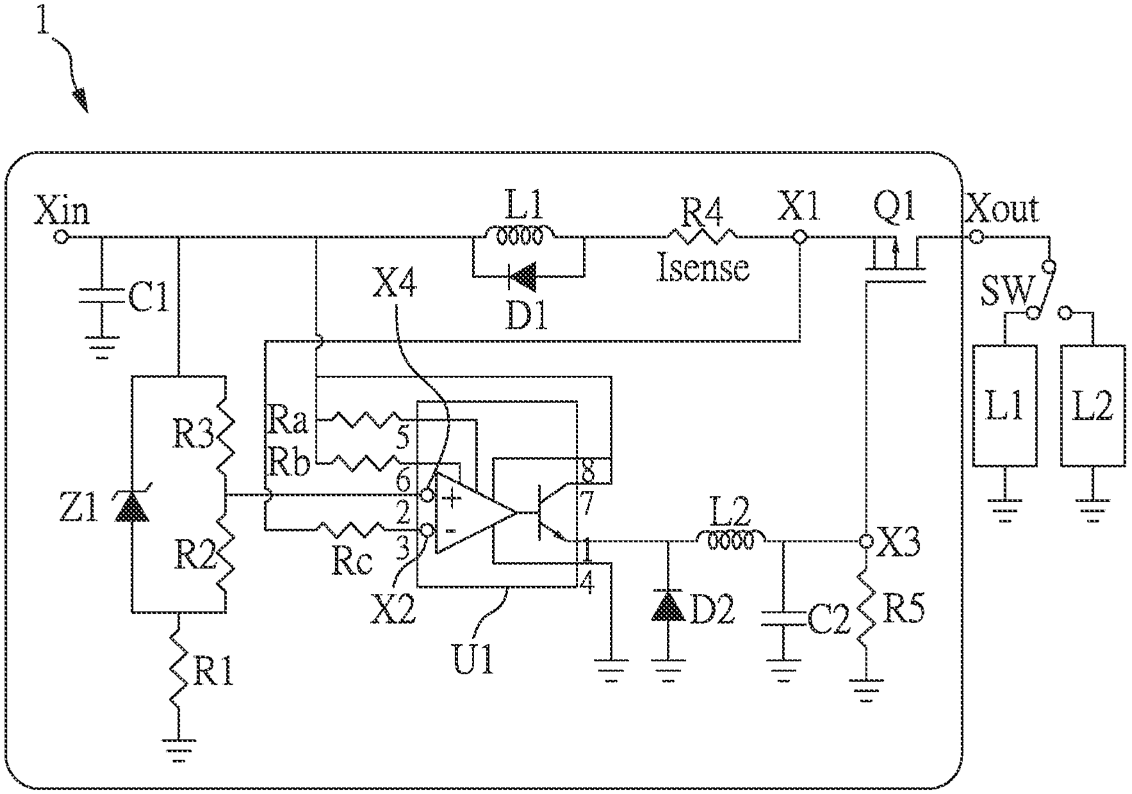
FIG. 8 shows a detailed circuit diagram of the soft start module according to the fourth embodiment of the present invention.

FIG. 8 shows a detailed circuit diagram of the soft start module 1 according to the fourth embodiment of the present invention. The fourth embodiment is described with reference to FIG. 4, The fourth embodiment is almost the same as the aforementioned embodiments, except that constant current control circuit 40 is implemented by a dedicated comparator unit U1 with a plurality of resistors Rn, Rb, and Re. The output of the dedicated comparator unit U1 of the constant current control circuit 40 is sent to the gate of the first transistor Q1 of the power component 10 via an auxiliary circuit. The auxiliary circuit may include a diode D2, an inductor L2, a capacitor C2, and a resistor R5. The configurations and the functions of the remaining components can be referred to the aforementioned embodiments, and their details are omitted here.

Although the present invention has been explained in relation to its preferred embodiment, it is to be understood that many other possible modifications and variations can be made without departing from the spirit and scope of the invention as hereinafter claimed.

What is claimed is:

1. A soft start module comprising:

a power component, having a first terminal connected to a first node, a second terminal connected to an output node, and a third terminal connected to a third node;

a current sensing component, having a fourth terminal connected to an input node and a fifth terminal connected to the first node;

a reference voltage generating circuit, having a seventh terminal connected to a fourth node and an eighth terminal connected to a ground node; and a constant current control circuit, having a ninth terminal connected directly or indirectly to the fifth terminal of the current sensing component, a tenth terminal connected the fourth node, and an eleventh terminal connected to the third node.

2. The soft start module of claim 1, wherein the output node is connected to a first load and a second load via a switch.

3. The soft start module of claim 1, wherein the power component is a first transistor, the first transistor is a power transistor, and the power transistor is a power MOSFET, an IGBT, or a SiC MOSFET.

4. The soft start module of claim 1, wherein the current sensing component includes a fourth resistor connected between the input node and the first node.

5. The soft start module of claim 1, wherein the reference voltage generating circuit includes a first Zener diode or a first voltage stabilizer IC connected between the input node and a first resistor, and a voltage divider formed of a second resistor and a third resistor is connected in parallel to the first Zener diode or a first voltage stabilizer IC, wherein the second resistor and the third resistor are connected at the fourth node.

6. The soft start module of claim 1, wherein the constant current control circuit includes a first amplifier having a non-inverting input end connected to the fourth node, an inverting input end connected directly or indirectly to the first node, and an output end connected directly or indirectly to the third node.

7. The soft start module of claim 6, where the current sensing component further includes a sixth terminal connected to a second node, and the ninth terminal of the constant current control circuit is connected to the second node.

8. The soft start module of claim 7, wherein the inverting input end of the first amplifier is connected to the second node.

9. The soft start module of claim 8, further comprising a fifth resistor connected between the first node and the second node.

10. The soft start module of claim 7, further comprising a second capacitor connected between the second node and the output end of the first amplifier.

11. The soft start module of claim 6, further comprising a second Zener diode or a second voltage stabilizer IC connected between the first node and the third node.

12. The soft start module of claim 6, further comprising a sixth resistor connected between the output end of the first amplifier and the third node.

13. The soft start module of claim 6, further comprising a second Zener diode or a second voltage stabilizer IC connected between the output end of the first amplifier and the third node.

14. The soft start module of claim 6, further comprising a sixth resistor connected between the input node and the third node.

15. The soft start module of claim 1, further comprising an activating circuit connected among the input node, the output node, and the constant current control circuit, wherein the activating circuit is configured to detect a load at the output node, and activate the constant current control circuit if a load exists at the output node, but deactivate the constant current control circuit if no load exists at the output node.

16. The soft start module of claim 15, wherein the activating circuit includes a second transistor used to activate or deactivate the constant current control circuit.

17. The soft start module of claim 16, wherein the activating circuit includes a second amplifier used to control the second transistor b comparing the output node's voltage and the input node's voltage.

18. The soft start module of claim 1, wherein the current sensing component includes a first parallel circuit thrilled of a first inductor and a first diode connected between the input node and the first node.

19. The soft start module of claim 18, wherein the current sensing component includes a fourth resistor connected between the input node and the first parallel circuit.

20. The soft start module of claim 1, wherein the second terminal of the first transistor is indirectly connected to the output node, and the soft start module further includes a second parallel circuit formed of a second inductor and a second diode connected between the second terminal of the first transistor and the output node.

21. The soft start module of claim 1, further comprising an amplifier to amplify a signal from the current sensing component.

22. The soft start module of claim 21, wherein the first amplifier of the constant current control circuit serves as a first comparator and the constant current control circuit includes a driver connected between the first comparator and the power component.

* * * * *